(12) United States Patent
Schweizer et al.

(10) Patent No.: US 9,434,119 B2
(45) Date of Patent: Sep. 6, 2016

(54) QUICK-CONNECT COUPLING

(75) Inventors: Beat Schweizer, Titterten (CH); Martin Moritz, Landser (FR)

(73) Assignee: Von Arx AG, Sissach (CH)

( * ) Notice: Subject to any disclaimer, the term of this patent is extended or adjusted under 35 U.S.C. 154(b) by 877 days.

(21) Appl. No.: 13/449,770

(22) Filed: Apr. 18, 2012

(65) Prior Publication Data
US 2012/0319398 A1    Dec. 20, 2012

(30) Foreign Application Priority Data

Jun. 16, 2011 (CH) ........................................ 1006/11

(51) Int. Cl.
    *B23B 31/107* (2006.01)
    *B30B 15/02* (2006.01)
    *B23B 31/26* (2006.01)

(52) U.S. Cl.
CPC ......... B30B 15/026 (2013.01); B23B 31/1071 (2013.01); *B23B 31/263* (2013.01); *B23B 2260/022* (2013.01); *Y10T 279/17145* (2015.01); *Y10T 279/17196* (2015.01); *Y10T 279/17752* (2015.01); *Y10T 279/17811* (2015.01)

(58) Field of Classification Search
CPC .............. B23B 31/1071; B23B 31/22; B23B 2260/022; B30B 15/026; Y10T 279/17752; Y10T 279/17145; Y10T 279/17196; Y10T 279/17811
USPC .................. 279/22, 30, 75, 82, 905
See application file for complete search history.

(56) References Cited

U.S. PATENT DOCUMENTS

| | | | |
|---|---|---|---|
| 68,567 A * | 9/1867 | Furbish | ............................ 168/45 |
| 685,677 A * | 10/1901 | Furbish | ............... B23B 31/1253 |
| | | | 279/22 |
| 2,255,333 A | 9/1941 | Scheiwer | |
| 2,255,695 A | 9/1941 | Bull | |
| 3,190,168 A | 6/1965 | Sullivan | |

(Continued)

FOREIGN PATENT DOCUMENTS

| | | |
|---|---|---|
| DE | 1108528 | 6/1961 |
| DE | 1108528 B | 6/1961 |

(Continued)

OTHER PUBLICATIONS

Final Office Action dated Oct. 16, 2014 for U.S. Appl. No. 13/449,821.

(Continued)

*Primary Examiner* — Eric A Gates
*Assistant Examiner* — Paul M Janeski
(74) *Attorney, Agent, or Firm* — Paul D. Bianco; Katharine Davis; Fleit Gibbons Gutman Bongini & Bianco PL

(57) ABSTRACT

A quick-connect coupling for connecting an exchangeable head to a pressing device has balls K1 with a diameter D1, which are radially movably disposed in a ball-holding part on the pressing device. Balls K1 being held radially fixed in a groove on the head with a depth N1 by a locking ring in the connected state. The head has a further peripheral groove with a depth N2. The further groove is designed to hold part of further balls K2 with a diameter D2, wherein the balls K2 are likewise disposed in a radially movable manner in the ball-holding part and wherein the diameter D2 is greater than the diameter D1. The diameter D1 is the same or smaller than the difference between the diameter D2 and the groove depth N2.

18 Claims, 5 Drawing Sheets

(56) References Cited

U.S. PATENT DOCUMENTS

| | | |
|---|---|---|
| 3,583,715 A | 6/1971 | Jarhl |
| 3,937,055 A | 2/1976 | Caruso et al. |
| 3,947,047 A | 3/1976 | Hultman |
| 4,107,949 A | 8/1978 | Wanner |
| 4,111,592 A | 9/1978 | Schnitzler |
| RE31,755 E | 12/1984 | Wanner |
| 5,003,847 A | 4/1991 | Wagner |
| 5,209,153 A | 5/1993 | Araki et al. |
| 5,253,554 A | 10/1993 | Riera et al. |
| 5,730,022 A | 3/1998 | Hansson et al. |
| 5,957,634 A | 9/1999 | Carpinetti |
| 6,290,606 B1 | 9/2001 | Hodson |
| 6,324,768 B1 | 12/2001 | Wellman |
| 6,324,884 B1 | 12/2001 | Barjesteh et al. |
| 6,461,089 B2 | 10/2002 | Adrian et al. |
| 6,511,268 B1 | 1/2003 | Vasudeva |
| 6,718,870 B1 | 4/2004 | Frenken |
| 6,953,196 B1 | 10/2005 | Huang |
| 7,140,817 B1 | 11/2006 | Phillips et al. |
| 7,520,495 B2 | 4/2009 | Stark |
| 7,641,415 B2 | 1/2010 | Fox et al. |
| 7,839,053 B2 | 11/2010 | Hamasaki et al. |
| 8,636,287 B2 * | 1/2014 | Wienhold ................ 279/75 |
| 9,242,422 B2 | 1/2016 | Schweizer |
| 2002/0017753 A1 | 2/2002 | Adrian et al. |
| 2004/0161313 A1 | 8/2004 | Nordlin |
| 2005/0120770 A1 | 6/2005 | Frenken |
| 2007/0063403 A1 | 3/2007 | Stark |
| 2009/0290931 A1 | 11/2009 | Blanchard |
| 2010/0005849 A1 | 1/2010 | College |
| 2012/0319398 A1 | 12/2012 | Schweizer et al. |
| 2012/0319399 A1 | 12/2012 | Schweizer |
| 2014/0260505 A1 | 9/2014 | Bowles et al. |

FOREIGN PATENT DOCUMENTS

| | | |
|---|---|---|
| DE | 2426760 A1 | 1/1975 |
| DE | 2614531 A1 | 10/1976 |
| DE | 2551125 | 5/1977 |
| DE | 2551125 A1 | 5/1977 |
| DE | 2614532 B1 | 9/1977 |
| DE | 20012706 U1 | 9/2000 |
| DE | 10046869 A1 | 4/2002 |
| DE | 20312887 U1 | 10/2003 |
| DE | 203128287 | 10/2003 |
| DE | 202009010128 U1 | 10/2009 |
| EP | 0253177 | 1/1988 |
| EP | 1084798 | 3/2001 |
| EP | 1084798 A2 | 3/2001 |
| EP | 1244187 | 9/2002 |
| EP | 2535128 | 12/2012 |
| FR | 2437910 A1 | 4/1980 |
| FR | 2649028 A1 | 1/1991 |
| JP | 3042199 A | 2/1991 |
| WO | 98/47653 | 10/1998 |
| WO | 2004/091862 A2 | 10/2004 |
| WO | 2010/128131 A2 | 11/2010 |
| WO | 2012171732 | 12/2012 |
| WO | 2013152549 | 10/2013 |
| WO | 2014/193765 | 12/2014 |

OTHER PUBLICATIONS

Thorne & Derrick UK: "Generation Safety Plus;" www.cablejoints.co.uk; 16 pages.
International Search Report and Written Opinion for PCT/US2014/039473 mailed Oct. 3, 2014.
Office Action dated Jul. 2, 2014 for U.S. Appl. No. 13/449,821.
Response filed on Oct. 2, 2014 for Office Action dated Jul. 2, 2014 for U.S. Appl. No. 13/449,821.
Thorne & Derrick UK; "Generation Safety Plus;" www.cablejoints.co.uk; 16 pages.
EK 60 UNV-L Battery Powerred universal tool 6-300 mm2; http://www.klauke.com/katalog/en/ek-60-unv-I-11977; 3 pages.
Written Opinion of the International Searching Authority dated Dec. 16, 2013 for PCT/EP2012/058767 filed May 11, 2012.
International Search Report completed Sep. 18, 2012 for PCT/EP2012/058767 filed May 11, 2012.
International Preliminary Report on Patentability dated Dec. 17, 2013 for PCT/EP2012/058767 filed May 11, 2012.
Response to Office Action filed Feb. 13, 2015 for U.S. Appl. No. 13/449,821.
International Search Report dated Oct. 3, 2014 for PCT/US2014/039473.
Office Action dated Mar. 13, 2015 for U.S. Appl. No. 13/449,821.
Response file Jun. 12, 2015 to Office Action dated Mar. 13, 2015 for U.S. Appl. No. 13/449,821.
Notice of Allowance dated Sep. 14, 2015 or U.S. Appl. No. 13/449,821.
Chinese Office Action dated May 27, 2015 for Chinese Application No. 201210194064.0.

* cited by examiner

QUICK-CONNECT COUPLING

CROSS REFERENCE TO RELATED APPLICATIONS

This application claims priority to Swiss Patent Application No. CH-01006/11 filed Jun. 16, 2011 the contents of which are incorporated herein by reference.

FIELD OF THE INVENTION

The invention relates to a quick-connect coupling for connecting an exchangeable head to a pressing device.

BACKGROUND OF THE INVENTION

Pressing devices are used for various purposes, such as, for example, pressing cable shoes onto electrical cables, but also for cutting cables or punching holes into sheet metal constructions. In order to perform these different applications on one machine, an exchangeable head system is required. To simplify matters, the different mountable heads are referred to in the following as exchangeable heads. Using the same pressing device with different exchangeable heads, it is quick and easy to change over to different applications where necessary.

However, a particular problem affecting pressing devices with exchangeable heads is the longitudinal forces being transmitted, in other words, the compressive forces produced by the pressing devices, because the coupling mechanism by which the exchangeable head is attached to the pressing device naturally has to withstand these forces and the corresponding safety requirements are relatively high. It is advantageous, therefore, to find a coupling mechanism that can be handled quickly and easily and yet offers operational safety, even with high and very high longitudinal forces.

Quick-connect coupling mechanisms are known per se. A quick-connect coupling mechanism used particularly frequently for torque transmission, especially in the field of hand machine tools, employs a solution with movable locking bodies, usually balls, which engage with corresponding grooves in the exchangeable tool in the connected state. An example of this is known from DE-2 551 125, whereby percussion drills are held in a tool holder on a machine tool in an easily exchangeable manner. Although longitudinal forces are naturally also active here, these are compressive forces (seen in relation to the machine tool/tool connection), so that there is no risk of the quick-connect coupling being released under load by the longitudinal forces and thereby representing a safety risk.

However, solutions are also known in which the same functional principle is also used with quick-connect couplings, where longitudinal forces are active, which represent traction forces in relation to the parts being connected. An example of this sort of connection is disclosed in DE-1 108 528. This specification shows a valve coupling for hose lines and pipelines. In this case, a coupling sleeve exhibits radial wall bores in which radially movable balls are disposed, which may project into a peripheral groove of a coupling plug. A spring-mounted locking sleeve prevents the balls from slipping out of the peripheral groove. Because this is an application in which pressurised fluids are conducted through connectable lines, although there is a certain safety risk, because evidently no applications involving very high fluid pressures are envisaged, additional measures do not seem necessary.

The situation is different, however, when the same functional principle is to be used in a quick-connect coupling to connect an exchangeable head to a powerful pressing device. Because relatively high pressures are used in this case (for example >50 kN), special additional measures are needed in order to guarantee safety and reliability.

SUMMARY OF THE INVENTION

It is anobject of the present disclosure, therefore, to indicate a quick-connect coupling with loading capacity to connect an exchangeable head to a pressing device, wherein the quick-connect coupling is based on the known construction principle with movable locking bodies in the form of balls, which engage in corresponding grooves in an exchangeable head in the coupled state. This quick-connect coupling should endure high longitudinal traction forces on a sustained basis and, if possible, without wear and guarantee a high degree of safety.

A further object involves the quick-connect coupling specified being designed in such a way that it is impossible for the pressing device and the interchangeable head to be wrongly assembled.

The present disclosure involves in principle the use in a generic quick-connect coupling of a further peripheral groove on the exchangeable head, on the one hand, and a greater number of locking bodies (balls) and also balls of different sizes, and, on the other hand, the further peripheral groove disposed closer to the pressing device being dimensioned with the associated locking bodies (balls), such that it is impossible to use the exchangeable head if it is wrongly positioned.

In accordance with the disclosure, a generic quick-connect coupling between a first and a second component should be taken to mean the following in this case: In a ball-holding part on a first component (in this case the pressing device), a number of balls K1 with a diameter D1 is radially movably disposed. On a second component (in this case the exchangeable head) a peripheral groove with a groove depth N1 to partially hold the balls K1 is present on a shaft part in an area with a shaft radius R1 with the first and second components in a connected state. In this case, a locking ring is movably attached to the ball-holding part in an axial direction and in a spring-mounted manner, the balls K1 being held radially fixed in the peripheral groove by said locking ring when the first and second component are in the connected state.

More particularly, in accordance with the present disclosure, it is provided that:—on the shaft section of the second component (exchangeable head) in an area with a further shaft radius R2, which is smaller than the shaft radius R1, there is a further peripheral groove with a further groove depth N2 and the further peripheral groove is disposed closer to the first component (pressing device) in an axial direction, the further peripheral groove is designed to hold part of further balls K2 with a further diameter D2, wherein the further balls K2 are likewise disposed in a radially movable manner in the ball-holding part and wherein the further diameter D2 is greater than the diameter D1, and the diameter D1 of the balls K1 is the same as or smaller than the difference between the diameter D2 of the further balls K2 and the further groove depth N2.

By using a further peripheral groove and with the associated use of a larger number of locking bodies (balls), as well as with balls of different sizes, it is possible to achieve the transmission of smaller forces per locking body (ball), or else the transmission of greater forces. The dimensions of the quick-connect coupling, i.e. particularly the dimensions of the balls K1, K2 and the groove depth N2, mean that if the exchangeable head is not completely inserted into the ball-holding part on the pressing device, a fixed connection cannot be made (in other words, a connection in which power is only transmitted across a single peripheral groove and the locking bodies engaging with it). Non-lockability in the event of incorrect assembly is notably important, because this is exactly what must be completely and reliably prevented, due to the associated risks (breakage of the quick-connect coupling when there is a build-up of pressure). The present disclosure has the added advantage that an embodiment functions purely mechanically and does not require electronic monitoring.

It has also emerged that with two peripheral grooves and a total of at least 12 balls—and of course using tool steels that are sufficiently hard and tough to avoid lasting deformation—the specified longitudinal forces in the region of 60 kN can be reliably transmitted.

Also advantageous is an angularly offset arrangement of the balls K1 in the peripheral groove compared with the balls K2 in the further peripheral groove. The forces can thereby be more effectively distributed over the entire cross-section.

A further advantage is also that an arrangement of the embodiment facilitates the unlimited twistability of the exchangeable head in relation to the pressing device.

A further measure that ensures that the quick-connect coupling is able to withstand high longitudinal traction forces on a sustained basis and with as little wear as possible, involves the peripheral grooves each being provided with a base surface and side faces, namely in such a way that the balls K1 and K2 have a point contact with the base surface and the side faces in the connected state and that the point contact with the side face is made roughly in the region of the half groove depth N1, N2. This means that the locating point of the balls is moved from the entry edge of the peripheral grooves sensitive to deformation towards the entry centre of the peripheral grooves, which significantly increases wear resistance.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

Figure 1:
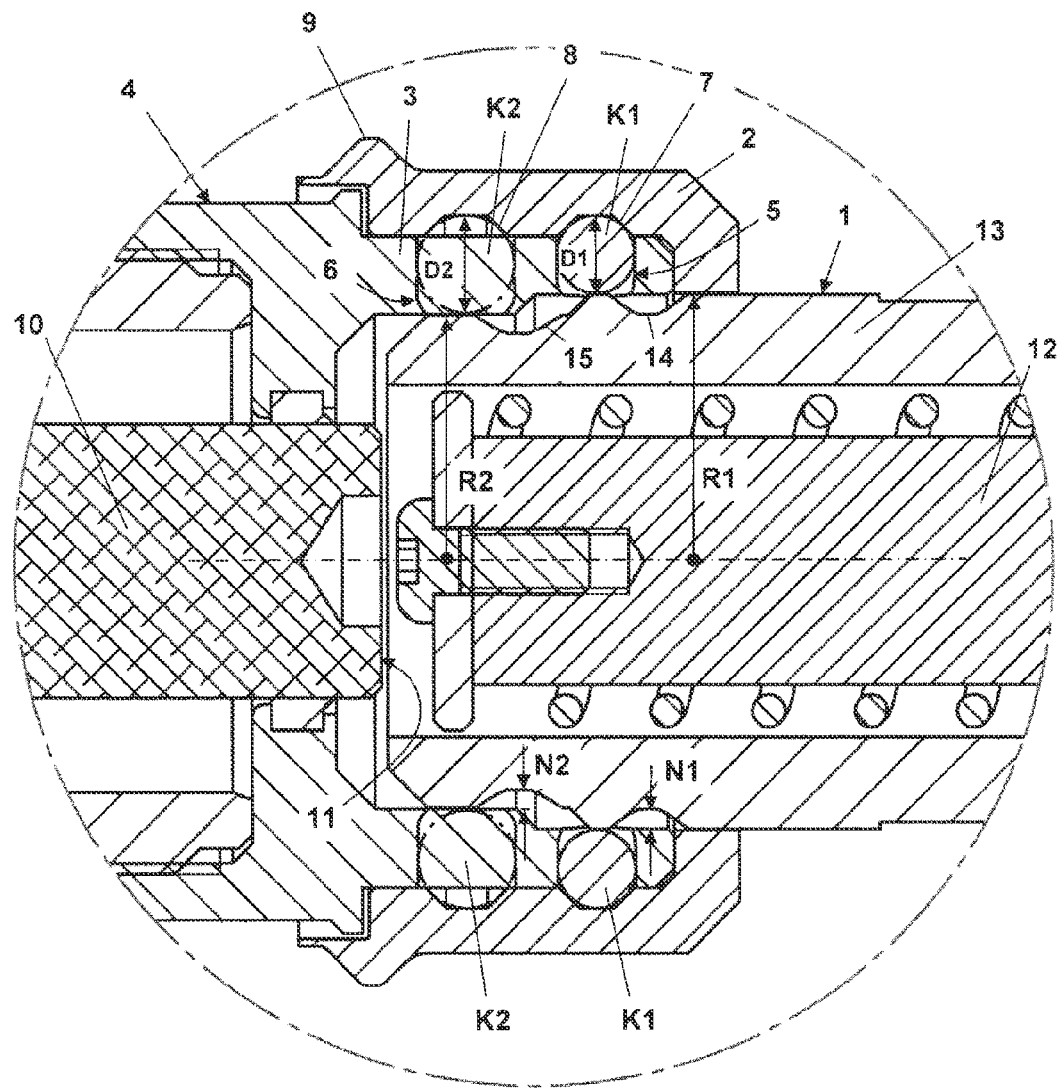
FIG. 1 shows a sectional drawing of an exchangeable head partly inserted in the quick-connect coupling with the locking ring in an unlocked position.

FIG. 1 shows a sectional drawing of an exchangeable head 1 partly inserted in the quick-connect coupling with a locking ring 2 in an unlocked position. In this case, the locking ring 2 and a ball-holding part 3 are parts of the quick-connect coupling, which are connected to a pressing device 4. In the ball-holding part 3, balls K1 with a diameter D1 and further balls K2 with a further diameter D2 are disposed in ball guides 5, 6 such that they are radially movable. The balls K1, K2 act as movable locking bodies. In addition, the balls K1, K2 and the ball guides 5, 6 are distributed over the periphery of the ball-holding part 3. Furthermore, the ball-holding part 3 has staggered internal radii, namely an area with a greater outside internal radius R1 in the area of the ball guides 5 and the balls K1 and an area with a smaller inside internal radius R2 in the area of the ball guides 6 and the other balls K2. Special shaping of the ball guides 5, 6 on the inside of the ball-holding part 3 prevents the balls K1, K2 from falling out when the exchangeable head 1 is not inserted or not inserted fully.

The locking ring 2 is mounted on the ball-holding part 3 in an axially movable manner. The locking ring 2 has locating grooves 7, 8 on the inside, which are formed so that the balls K1, K2 can move away into the locating grooves 7, 8 when the locking ring 2 is in the unlocked position—as shown here—and thereby avoid obstructing the insertion of the exchangeable head 1. Not shown is a spring element that is mounted between the ball-holding part 3 and the locking ring 2 and permanently presses the locking ring 2 in an axial direction into the locking position (see FIG. 3). In order to achieve the unlocked position of the locking ring 2, as shown, the locking ring 2 must therefore be moved into this position manually by means of a gripping bar 9.

Since the quick-connect coupling described creates a mechanically secure, but detachable connection between the pressing device 4 and the exchangeable head 1 and the pressing device 4 transmits compressive forces onto the exchangeable head 1, there is a plunger 10 within the pressing device 4, via which pressure is transmitted onto an axially spring-mounted connecting rod 12 within the exchangeable head 1 during operation by means of a contact surface 11 on the plunger tip. If this is the case, the quick-connect coupling is naturally exposed to high axial forces, which act as traction forces and pull the pressing device 4 and the exchangeable head 1 apart.

The exchangeable head 1 has a shaft part 13 with outside radii that are likewise staggered and adapted to the corresponding graduations in the ball-holding part 3, namely an area with a shaft radius R1 and an area with a further shaft radius R2. The shaft radii R1, R2 of the exchangeable head 1 correspond to the inside radii R1, R2 of the ball-holding part 3, naturally with corresponding tolerances for an easy-to-handle sliding fit.

The shaft part 13 has a peripheral groove 14 with a groove depth N1 in the area of the shaft part 13 with the greater shaft radius R1. The peripheral groove 14 serves the partial holding of balls K1 with the pressing device 4 and the exchangeable head 1 in the connected state. The shaft part 13 has a further peripheral groove 15 with a groove depth N2 in the area of the shaft part 13 with the smaller shaft radius R2. The peripheral groove 15 serves to partially hold the balls K2 with the pressing device 4 and the exchangeable head 1 in the coupled state. The further peripheral groove 15 is disposed in the axial direction closer to the pressing device 4. In addition, the peripheral groove 14 and the further peripheral groove 15 naturally have the same axial spacing as the balls K1 and K2 in the ball-holding part.

Based on the sizes introduced, it can also be said that the proposed structural form meets the following general condition: $R1-N1+D1=R2-N2+D2$. This defines the context in which the condition formulated below for preventing incorrect assembly is to be understood (particularly evident from FIG. 3).

It is also true that with a structure of the type shown with the diameters D1 of the balls K1 should be equal to or smaller than the difference between the diameter D2 of the further balls K2 and the further groove depth N2; in other words, $D1 \leq D2-N2$. This condition means that no connection can be made between the exchangeable head 1 and the pressing device 4, in which the transmission of force only takes place via a single peripheral groove and the locking bodies (balls) engaging with it. If this condition is met, even in a case where the exchangeable head 1 is only inserted far enough for the other peripheral groove 15 to be located in the area of the balls K1—a position in which the locking ring 2 can be pushed into the locking position—no fixed connection can be made between the exchangeable head 1 and the pressing device, because the balls K1 can then still move way and are not fixable in the further peripheral groove 15.

Figure 2:
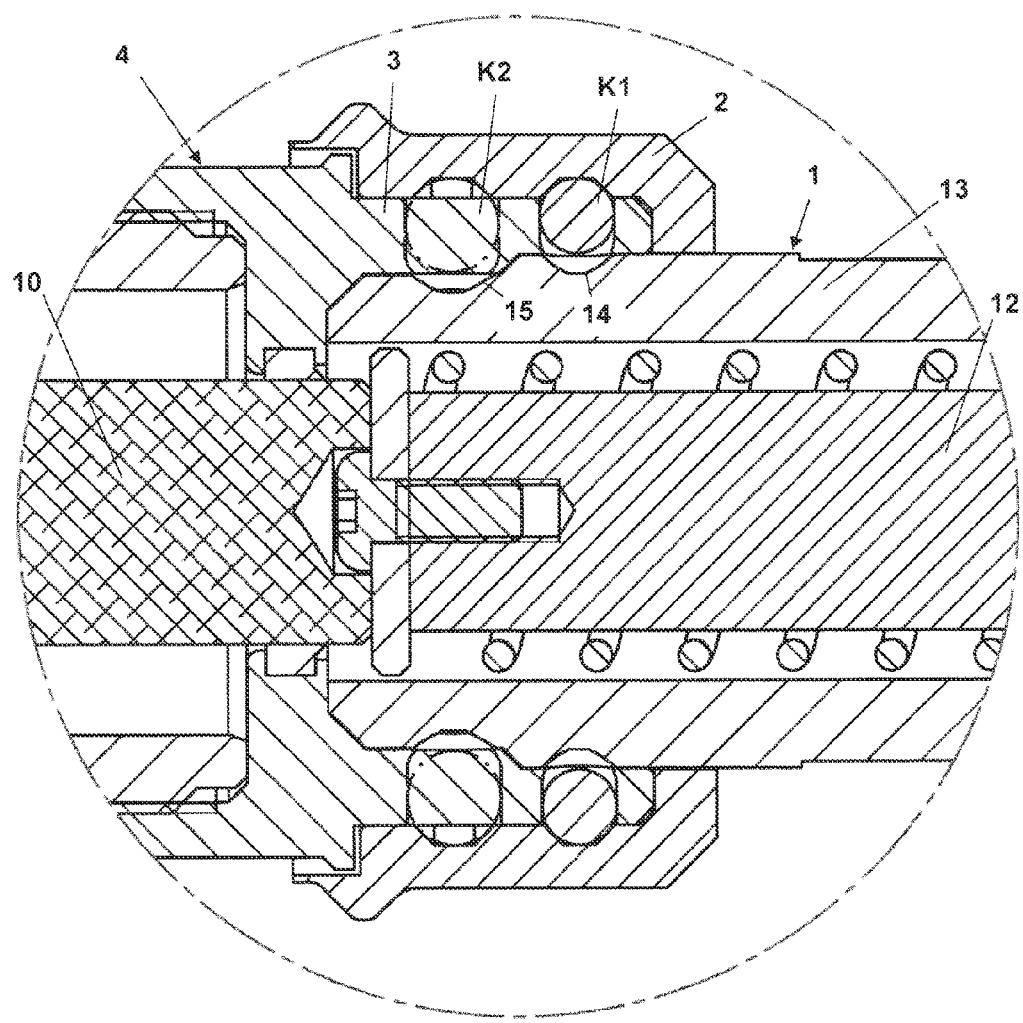
FIG. 2 shows a sectional drawing of an exchangeable head completely inserted in the quick-connect coupling with the locking ring in an unlocked position.

FIG. 2 shows a sectional drawing of an exchangeable head 1 completely inserted in the quick-connect coupling with the locking ring 2 in an unlocked position. It is made clear here that both the balls K1 and the further balls K2 can be slipped into the peripheral groove 14 or further peripheral groove 15 provided for them in each case following complete insertion of the exchangeable head 1 (and partly, although not shown here, also under the effects of gravity). However, the exchangeable head 1 is not yet locked in this position, because the balls K1, K2 can still move away into the locating grooves 7, 8 provided for this in the locking ring, when the exchangeable head 1 is pulled out again. In the position shown, the locking ring 2 can be inserted, however, or it will do this automatically, if the locking ring is released, under the effects of the spring force mentioned earlier.

Figure 3:
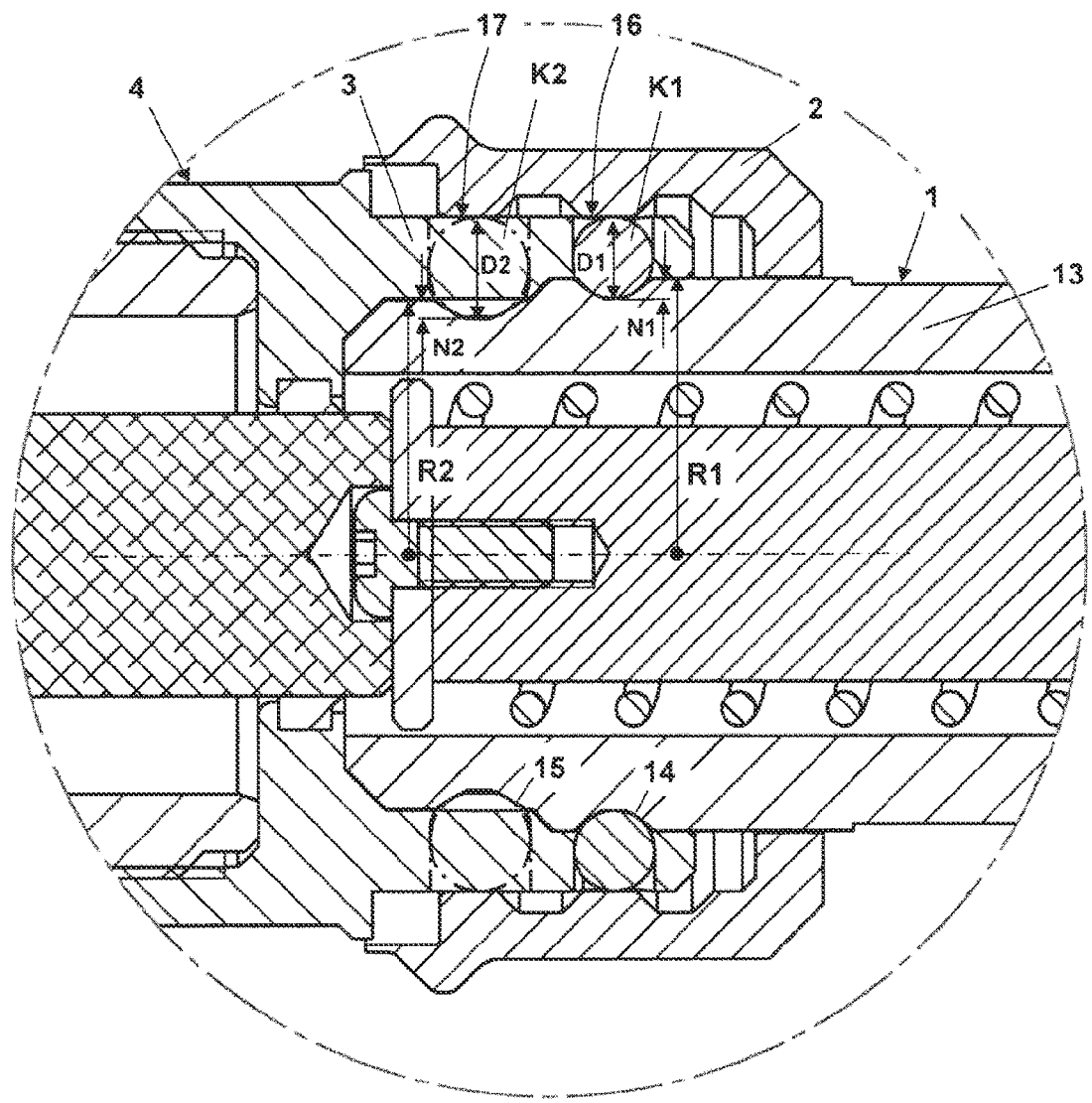
FIG. 3 shows a sectional drawing of an exchangeable head completely inserted in the quick-connect coupling with the locking ring in a locked position.

FIG. 3 shows a sectional drawing of an exchangeable head 1 completely inserted in the quick-connect coupling with the locking ring 2 in a locked position. It is made clear here that both the balls K1 and the further balls K2 are fixed in their radial position by stopping surfaces 16, 17 on the locking ring following complete insertion of the exchangeable head 1 and the advancing of the locking ring 2, such that they have no more freedom of movement and the exchangeable head is therefore locked. The balls K1, K2 now engage as a fixed locking body both with the shaft part 13 and also with the ball-holding part 3 and therefore prevent reciprocal movement.

Figure 4:
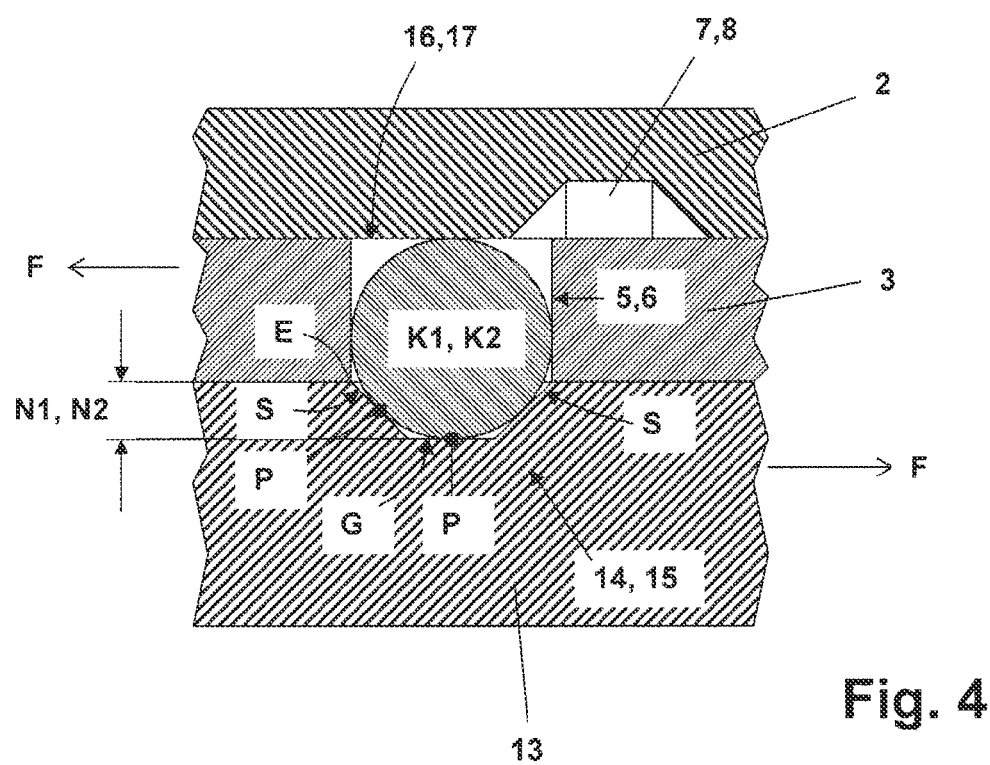
FIG. 4 shows a sectional detail drawing of the quick-connect coupling for the theoretical shaping of the peripheral grooves.

FIG. 4 shows a detail of a sectional drawing of the quick-connect coupling for the theoretical shaping of the peripheral grooves. The state shown corresponds section-by-section to that shown in FIG. 3, but is the same in principle for both peripheral grooves 14, 15. It is evident here that the peripheral grooves each display a base surface G and side faces S, namely, such that the balls K1, K2 have a point contact with the base surface G and the side face S at locating points P in the connected state and the point contact with the side face occurs in the area of the half groove depth N1, N2. In order to achieve the latter, the side faces S may also be divided into several curve sections and neither is it necessary for the individual curve sections to be straight lines. Under load, pressure is therefore transmitted to the contact points P on the side faces S. The entry edges E of the peripheral grooves 14, 15 sensitive to deformation therefore remain unloaded.

However, in order to keep the permanent deformation by balls K1, K2 as small as possible with the great forces anticipated F, tests have revealed that the hardness of the steel used for the shaft part 13 of the exchangeable head 4, for the ball-holding part 3 and for the locking ring 2 must be at least 60 HRC. Apart from the high hardness level, the steels used must also exhibit adequate toughness.

Figure 5:
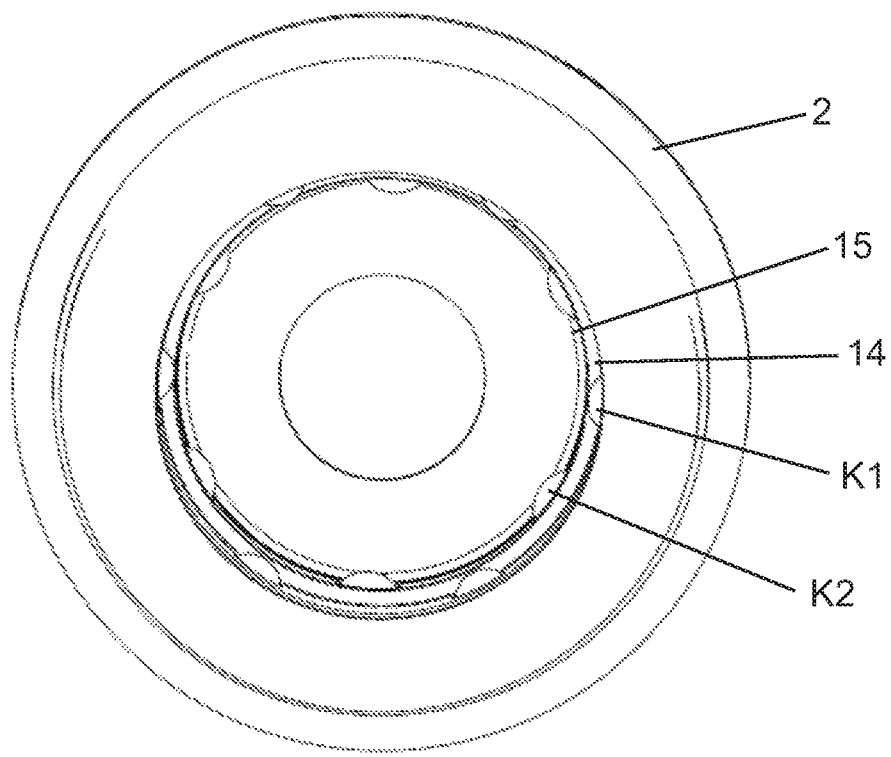
FIG. 5 shows a perspective view from above of the quick-connect coupling of FIGS. 1-3.

FIG. 5 is a perspective view from above of the quick-connect coupling of FIGS. 1-3. FIG. 5 shows the angularly offset arrangement of the first plurality of balls (K1) in the first peripheral groove as compared to the second plurality of balls (K2) in the second peripheral groove. FIG. 5 additionally shows the first and second peripheral grooves with an arrangement of 12 balls.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

All references cited herein are expressly incorporated by reference in their entirety. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

REFERENCE LIST

1 Exchangeable head
2 Locking ring
3 Ball-holding part
4 Pressing device
5 Ball guide
6 Ball guide
7 Locating groove
8 Locating groove
9 Gripping bar 10 Plunger
11 Contact surface
12 Connecting rod
13 Shaft part
14 Peripheral groove
15 Further peripheral groove
16 Stopping surface
17 Stopping surface
K1 Balls
K2 Further balls
D1 Diameter of the balls
D2 Diameter of the other balls
N1 Groove depth of the peripheral groove
N2 Groove depth of the further peripheral groove
R1 Shaft radius
R2 Further shaft radius
G Base surface of a peripheral groove
S Side face of a peripheral groove
P Locating point in the peripheral groove
E Insertion edge of the peripheral groove
F Axial force

What is claimed is:

1. A quick-connect coupling for connecting an exchangeable head to a pressing device, the quick-connect coupling comprising:
a first plurality of balls, each ball of the first plurality of balls having a diameter D1;
a ball-holding part located on the pressing device, the first plurality of balls radially movably disposed therein;
a locking ring movably attached to the ball-holding part in an axial direction, the locking ring having a locked position and an unlocked position;
a first peripheral groove in a shaft part of the exchangeable head, the first peripheral groove having a depth N1 to partially hold the first plurality of balls and the shaft part at the first peripheral groove having a shaft radius R1 when the exchangeable head and the pressing device are in a connected position and the locking ring is in the unlocked position;
a second plurality of balls, each ball of the second plurality of balls having a diameter D2 greater than D1; and
a second peripheral groove in the shaft part of the exchangeable head disposed closer to the pressing device in an axial direction than the first peripheral groove, the second peripheral groove having a depth N2 to partially hold the second plurality of balls radius when the exchangeable head and the pressing device are in a connected position and the locking ring is in the unlocked position; the shaft part at the second peripheral groove having a shaft radius R2 less than R1;
wherein the diameter D1 of the first plurality of balls is equal to or less than a difference of the diameter D2 of the second plurality of balls and the depth N2 of the second peripheral groove so that the first plurality of balls are positionable to move away from the shaft and are not fixable in the second peripheral groove such that no fixed connection can be made between the exchangeable head and the pressing device.

2. The quick-connect coupling according to claim 1, wherein structural form of the quick-connect coupling meets a condition of R1−N1+D1=R2−N2+D2.

3. The quick-connect coupling according to claim 1, wherein structural form of the quick-connect coupling meets a condition of D1≤D2−N2.

4. The quick-connect coupling according to claim 1, wherein the first plurality of balls and the second plurality of balls includes a total of at least 12 balls.

5. The quick-connect coupling according to claim 4, wherein the first plurality of balls are disposed angularly offset in the first peripheral groove compared to the second plurality of balls in the second peripheral groove.

6. The quick-connect coupling according to claim 4, wherein the first peripheral groove and the second peripheral groove each have a base surface G and side faces S and the balls of the first plurality of balls and the balls of the second plurality of balls have contact points with the base surface G and the side faces S in the connection position, in which the contact points with the side faces S are made at half depth of the first peripheral groove and at half depth of the second peripheral groove when the exchangeable head and the pressing device are in a connected position and the locking ring is in the unlocked position.

7. The quick-connect coupling according to claim 6, wherein the side faces S are divided into a plurality of sections or into a plurality of curved sections.

8. The quick-connect coupling according to claim 1, wherein the first plurality of balls are disposed angularly offset in the first peripheral groove compared to the second plurality of balls in the second peripheral groove.

9. The quick-connect coupling according to claim 8, wherein the first peripheral groove and the second peripheral groove each have a base surface G and side faces S and the balls of the first plurality of balls and the balls of the second plurality of balls have contact points with the base surface G and the side faces S in the connection position, in which the contact points with the side faces S are made at half depth of the first peripheral groove and at half depth of the second peripheral groove when the exchangeable head and the pressing device are in a connected position and the locking ring is in the unlocked position.

10. The quick-connect coupling according to claim 9, wherein the side faces S are divided into a plurality of sections or into a plurality of curved sections.

11. The quick-connect coupling according to claim 1, wherein the first peripheral groove and the second peripheral groove each have a base surface G and side faces S and the balls of the first plurality of balls and the balls of the second plurality of balls have contact points with the base surface G and the side faces S in the connection position, in which the contact points with the side faces S are made at half depth of the first peripheral groove and at half depth of the second peripheral groove when the exchangeable head and the pressing device are in a connected position and the locking ring is in the unlocked position.

12. The quick-connect coupling according to claim 11, wherein the side faces S are divided into a plurality of sections or into a plurality of curved sections.

13. A quick-connect coupling for connecting an exchangeable head to a pressing device, the quick-connect coupling comprising:
a first plurality of balls, each ball of the first plurality of balls having a diameter D1;
a ball-holding part located on the pressing device, the first plurality of balls radially movably disposed therein;
a locking ring movably attached to the ball-holding part in an axial direction, the locking ring having a locked position an unlocked position;
a first peripheral groove in a shaft part of the exchangeable head, the first peripheral groove having a depth to partially hold the first plurality of balls and the shaft part at the first peripheral groove having a shaft radius R1 when the exchangeable head and the pressing device are in a connected position and the locking ring is in the unlocked position;
a second plurality of balls, each ball of the second plurality of balls having a diameter D2 greater than D1; and
a second peripheral groove in the shaft part of the exchangeable head disposed closer to the pressing device in an axial direction than the first peripheral groove, the second peripheral groove having a depth to partially hold the second plurality of balls radius when the exchangeable head and the pressing device are in a connected position and the locking ring is in the unlocked position; the shaft part at the second peripheral groove having a shaft radius R2 less than R1;
wherein the first peripheral groove and the second peripheral groove each have a base surface G and side faces S and the balls of the first plurality of balls and the balls of the second plurality of balls have contact points with the base surface G and the side faces S in the connection position, in which the contact points with the side faces S are made at half depth of the first peripheral groove and at half depth of the second peripheral groove when the exchangeable head and the pressing device are in a connected position and the locking ring is in the unlocked position; and
wherein the diameter D1 of the first plurality of balls is equal to or less than a difference of the diameter D2 of the second plurality of balls and the depth of the second peripheral groove so that the first plurality of balls are positionable to move away from the shaft and are not fixable in the second peripheral groove such that no fixed connection can be made between the exchangeable head and the pressing device.

14. The quick-connect coupling according to claim 13, wherein the first plurality of balls and the second plurality of balls includes a total of at least 12 balls.

15. The quick-connect coupling according to claim 13, wherein the first plurality of balls are disposed angularly offset in the first peripheral groove compared to the second plurality of balls in the second peripheral groove.

16. The quick-connect coupling according to claim 13, wherein the side faces S are divided into a plurality of sections or into a plurality of curved sections.

17. A quick-connect coupling for connecting an exchangeable head to a pressing device, the quick-connect coupling comprising:

a first plurality of balls, each ball of the first plurality of balls having a diameter D1;
a ball-holding part located on the pressing device, the first plurality of balls radially movably disposed therein;
a locking ring movably attached to the ball-holding part in an axial direction, the locking ring having a locked position and an unlocked position;
a first peripheral groove in a shaft part of the exchangeable head, stopping surfaces of the locking ring radially fixing the first plurality of balls in the first peripheral groove when the exchangeable head and the pressing device are in a connected position and the locking ring is in the locked position such that a fixed connection is formed between the exchangeable head and the pressing device;
a second plurality of balls, each ball of the second plurality of balls having a diameter D2 greater than D1; and
a second peripheral groove in the shaft part of the exchangeable head disposed closer to the pressing device in an axial direction than the first peripheral groove, the stopping surfaces of the locking ring radially fixing the second plurality of balls in the second peripheral groove when the exchangeable head and the pressing device are in a connected position and the locking ring is in the locked position such that a fixed connection is formed between the exchangeable head and the pressing device;
wherein the diameter D1 of the first plurality of balls is equal to or less than a difference of the diameter D2 of the second plurality of balls and the depth N2 of the second peripheral groove so that the first plurality of balls are positionable to move away from the shaft and are not fixable in the second peripheral groove such that no fixed connection can be made between the exchangeable head and the pressing device;
wherein when the locking ring is moved from the locked position to the unlocked position the first plurality of balls move away from the exchangeable head such that the fixed connection between the exchangeable head and the pressing device is broken.

18. The quick-connect coupling according to claim 17, wherein the first plurality of balls and the second plurality of balls includes a total of at least 12 balls.

* * * * *